(12) United States Patent
Ohashi

(10) Patent No.: US 10,414,291 B2
(45) Date of Patent: Sep. 17, 2019

(54) VEHICLE SEAT

(71) Applicant: TOYOTA BOSHOKU KABUSHIKI KAISHA, Aichi (JP)

(72) Inventor: Koji Ohashi, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 24 days.

(21) Appl. No.: 15/696,753

(22) Filed: Sep. 6, 2017

(65) Prior Publication Data

US 2018/0065509 A1 Mar. 8, 2018

(30) Foreign Application Priority Data

Sep. 7, 2016 (JP) .................................. 2016-174943
Sep. 6, 2017 (JP) .................................. 2017-171259

(51) Int. Cl.
*B60N 2/427* (2006.01)
*B60N 2/07* (2006.01)
*B60N 2/16* (2006.01)

(52) U.S. Cl.
CPC .......... *B60N 2/0722* (2013.01); *B60N 2/168* (2013.01); *B60N 2/427* (2013.01)

(58) Field of Classification Search
CPC ...... B60N 2/42; B60N 2/4207; B60N 2/4221; B60N 2/4228; B60N 2/4235; B60N 2/4242; B60N 2/427; B60N 2/42709; B60N 2/42727; B60N 2/4754; B60N 2/10; B60N 2/12; B60N 2/16; B60N 2/168; B60N 2/1655; B60N 2/18; B60N 2/1803; B60N 2/1867; B60N 2/0722; B60N 2/1615

USPC ............................................... 297/344.1, 337
See application file for complete search history.

(56) References Cited

U.S. PATENT DOCUMENTS

| | | | | |
|---|---|---|---|---|
| 5,028,028 A * | 7/1991 | Yamada | ................. | B60N 2/071 248/430 |
| 5,192,045 A * | 3/1993 | Yamada | ................. | B60N 2/071 248/430 |
| 5,676,341 A * | 10/1997 | Tarusawa | ............. | B60N 2/0705 248/430 |
| 6,341,819 B1 * | 1/2002 | Kojima | ................. | B60N 2/071 248/429 |
| 6,568,743 B1 * | 5/2003 | Jayasuriya | ......... | B60N 2/42727 296/153 |
| 6,666,508 B1 * | 12/2003 | Hofmann | ............. | B60N 2/4214 297/216.1 |

(Continued)

FOREIGN PATENT DOCUMENTS

JP 2015-3592 1/2015

*Primary Examiner* — Kyle J. Walraed-Sullivan
(74) *Attorney, Agent, or Firm* — Greenblum & Bernstein, P.L.C.

(57) ABSTRACT

The vehicle seat comprises a seat main body, a base, a bracket, a link, and a contact portion. The base is located below the seat main body. The bracket is mounted on an upper side of the base. The link is rotatably coupled, at one end thereof, to the seat main body and is rotatably coupled, at an end thereof opposing the one end, to the bracket. The contact portion is provided to the bracket to restrict a rotatable range of the link by coming in contact with the link. The contact portion comprises a first contact portion and a second contact portion. The first contact portion is arranged in a position that partially differs from a position of the second contact portion in a width direction of the seat main body.

14 Claims, 6 Drawing Sheets

(56) References Cited

U.S. PATENT DOCUMENTS

| | | | | |
|---|---|---|---|---|
| 6,893,077 B1* | 5/2005 | DeJongh | B60N 2/42709 | |
| | | | 296/187.05 | |
| 7,523,913 B2* | 4/2009 | Mizuno | B60N 2/123 | |
| | | | 248/429 | |
| 7,562,926 B2* | 7/2009 | Kojima | B60N 2/123 | |
| | | | 296/65.09 | |
| 7,758,008 B2* | 7/2010 | Kojima | B60N 2/0818 | |
| | | | 248/429 | |
| 7,770,863 B2* | 8/2010 | Yamada | B60N 2/165 | |
| | | | 248/419 | |
| 8,215,711 B2* | 7/2012 | Fukuda | B60N 2/0705 | |
| | | | 248/429 | |
| 8,955,814 B2* | 2/2015 | Moriyama | B60N 2/0705 | |
| | | | 248/429 | |
| 9,238,484 B2* | 1/2016 | Jenkins | B62D 21/157 | |
| 9,637,033 B2* | 5/2017 | Fujita | B60N 2/1615 | |
| 9,963,048 B2* | 5/2018 | Nomura | B60N 2/0705 | |
| 2002/0011746 A1* | 1/2002 | Muhlberger | B60N 2/1615 | |
| | | | 297/344.12 | |
| 2004/0108751 A1* | 6/2004 | Scheidmantal | B60N 2/75 | |
| | | | 296/187.05 | |
| 2006/0202513 A1* | 9/2006 | Matsuda | B60N 2/4235 | |
| | | | 296/187.12 | |
| 2007/0120407 A1* | 5/2007 | Kojima | B60N 2/0705 | |
| | | | 297/344.11 | |
| 2015/0239373 A1* | 8/2015 | Weng | B60N 2/1615 | |
| | | | 297/216.1 | |
| 2016/0107549 A1* | 4/2016 | Janicek | B60N 2/0722 | |
| | | | 297/216.1 | |
| 2017/0368961 A1* | 12/2017 | Murakami | B60N 2/07 | |
| 2018/0065509 A1* | 3/2018 | Ohashi | B60N 2/0722 | |
| 2018/0222356 A1* | 8/2018 | Ishihara | B60N 2/54 | |

* cited by examiner

VEHICLE SEAT

CROSS-REFERENCE TO RELATED APPLICATIONS

This application claims the benefit of Japanese Patent Application No. 2016-174943 filed on Sep. 7, 2016 with the Japan Patent Office, and the entire disclosure of Japanese Patent Application No. 2016-174943 is incorporated herein by reference.

BACKGROUND

The present disclosure relates to a vehicle seat.

A vehicle seat disclosed in Japanese Unexamined Patent Application Publication No. 2015-3592 comprises a seat main body, a base located below the seat main body, a bracket mounted on an upper side of the base, and a link. One end of the link is rotatably coupled to the seat main body, and the other end of the link is rotatably coupled to the bracket.

The bracket is provided with a contact portion that restricts a rotatable range of the link by coming in contact with the link. In a crash of a vehicle equipped with the vehicle seat, rotation of the link with respect to the bracket brings the contact portion into contact with the link, thus inhibiting further rotation of the link.

SUMMARY

Attaching various types of equipment may increase the weight of the seat main body. The seat main body with an increased weight may cause the link to be tilted in a width direction and to not contact the contact portion (especially during a crash). One possible countermeasure to this is to increase a plate thickness of the link. However, it is desirable to save weight (and save expense) by not increasing the plate thickness of the link.

One aspect of the present disclosure is preferably a vehicle seat that inhibits further rotation of the link when tilting occurs without increasing the plate thickness of the link.

One embodiment of the present disclosure is a vehicle seat comprising a seat main body, a base, a bracket, a link, and a contact portion. The base is located below the seat main body. The bracket is mounted on an upper side of the base. The link is rotatably coupled, at one end thereof, to the seat main body and is rotatably coupled, at an end thereof opposing the one end, to the bracket. The contact portion is provided to the bracket to restrict a rotatable range of the link by coming in contact with the link. The contact portion comprises a first contact portion and a second contact portion. The first contact portion is arranged in a position that partially differs from a position of the second contact portion in a width direction of the seat main body.

The vehicle seat according to the present disclosure comprises the first contact portion in addition to the second contact portion. The first contact portion is arranged in the position that partially differs from the position of the second contact portion in the width direction of the seat main body. When the link is tilted in the width direction of the seat main body and thus there is no contact between the link and the second contact portion in, for example, a crash of the vehicle equipped with the vehicle seat, rotation of the link is inhibited by contact between the link and the first contact portion. It is not necessarily required to increase a plate thickness of the link to restrict the rotation of the link.

According to one embodiment of the present disclosure, the bracket may comprise a first part comprising the first contact portion and a second part comprising the second contact portion and being separate from the first part.

Such a configuration allows a relative position of the second contact portion with respect to the first contact portion to be adjusted by changing a relative position of the second part with respect to the first part. Consequently, this facilitates adjustment of the relative position of the second contact portion with respect to the first contact portion.

According to one embodiment of the present disclosure, a position of at least part of the first contact portion and a position of at least part of the second contact portion may align in a front-rear direction of the vehicle seat.

Such a configuration more fully ensures the contact between the link and the first contact portion when the link is tilted in the width direction of the seat main body and thus there is no contact between the link and the second contact portion in, for example, a crash of the vehicle equipped with the vehicle seat.

According to one embodiment of the present disclosure, the first contact portion may comprise, at an end thereof in the width direction of the seat main body, a bent portion that is bent upward.

Such a configuration inhibits the link from slipping off the first contact portion since the link coming down is contacted by the bent portion.

According to one embodiment of the present disclosure, the bent portion may have an approximately L shape in a front view.

Such a configuration inhibits the link from slipping off the first contact portion since the link coming down is contacted by the bent portion having an approximately L shape.

BRIEF DESCRIPTION OF THE DRAWINGS

Example embodiments of the present disclosure will be described hereinafter with reference to the accompanying drawings, in which.

DETAILED DESCRIPTION OF THE PREFERRED EMBODIMENTS

First Embodiment

1. Configuration of Vehicle Seat 1

Descriptions of a configuration of a vehicle seat 1 will be given below based on FIG. 1 to FIG. 6. The vehicle seat 1 is a seat for an automobile. Unless otherwise noted, hereinafter, "front/frontward" means the front/frontward of the vehicle seat 1 and the automobile, and "rear/rearward" means the rear/rearward of the vehicle seat 1 and the automobile.

Figure 1:
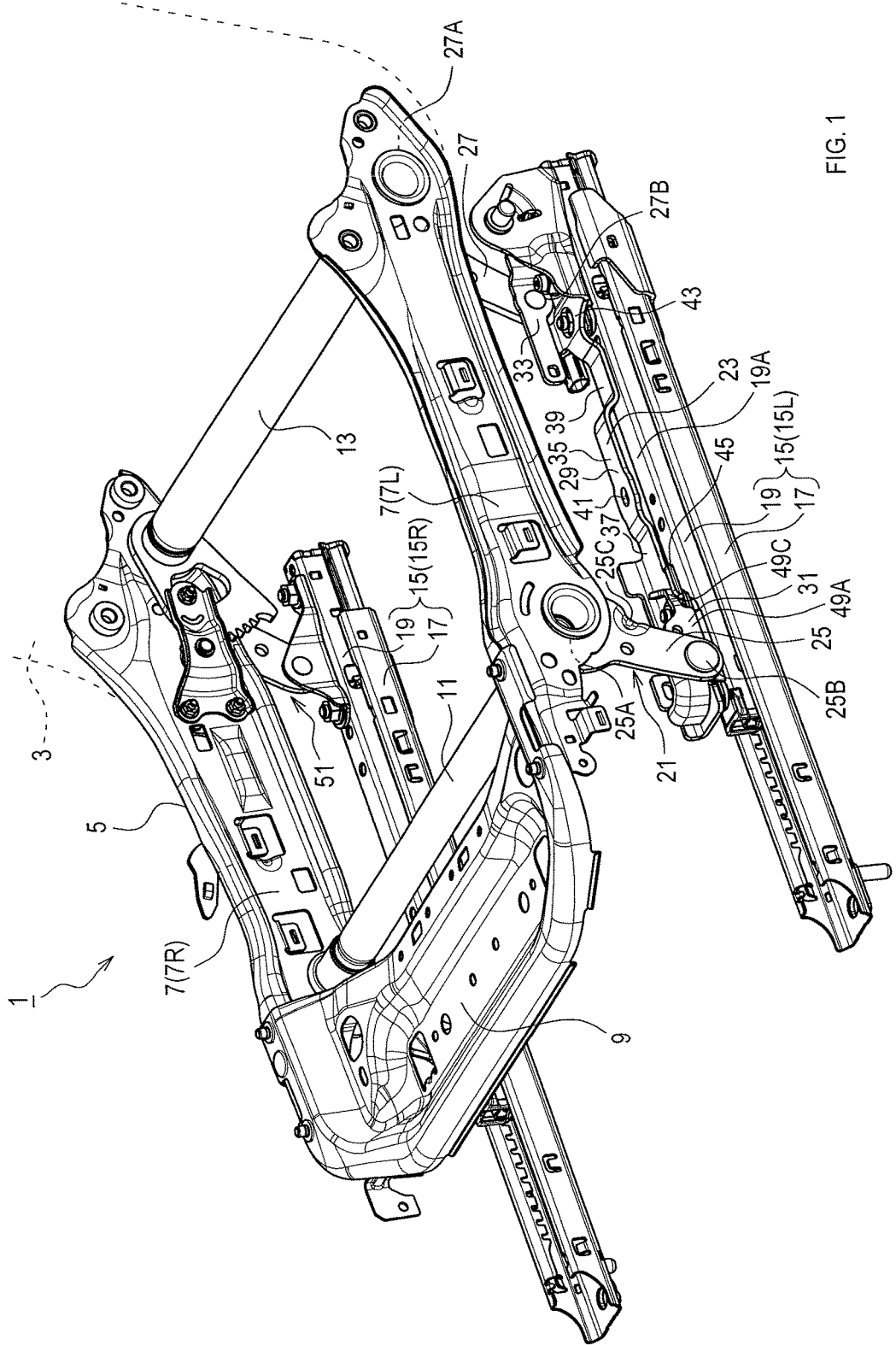
FIG. 1 is a perspective view illustrating a configuration of a vehicle seat.

The vehicle seat 1 may comprise: seatback 3, seat cushion 5, front panel 9, front pipe 11, rear pipe 13, slide rail 15, link mechanism 21, and rear pivotally supporting part 33. As shown in FIG. 1, the vehicle seat 1 includes the seatback 3 as a backrest for an occupant (not shown) and the seat cushion 5 as a sitting part for the occupant. The seat cushion 5 corresponds to (is also known as) a seat main body.

The seat cushion 5 comprises two side frames 7R and 7L arranged right and left in parallel with each other, the front panel 9, the front pipe 11, and the rear pipe 13. The front panel 9 joins together respective front ends of the two side frames 7R and 7L. The front panel 9 supports the thighs of the occupant from below.

The front pipe 11 and the rear pipe 13 are round pipes of metal. The front pipe 11 and the rear pipe 13 join together the two side frames 7R and 7L. The front pipe 11 is located rearward of the front panel 9. The rear pipe 13 is located rearward of the front pipe 11, joining together respective rear ends of the two side frames 7R and 7L.

As shown in FIG. 1, the vehicle seat 1 comprises two slide rails 15R and 15L arranged right and left in parallel with each other. A longitudinal direction of the two slide rails 15R and 15L is a front-rear direction. The two slide rails 15R and 15L are arranged respectively at a right end and at a left end of the vehicle seat 1. The slide rail 15 comprises a lower rail 17 and an upper rail 19. The lower rail 17 is fixedly mounted to a floor (not shown) of the automobile. The upper rail 19 is slidable with respect to the lower rail 17 in the front-rear direction. The slide rail 15 serves as a base for mounting the link mechanism 21. Generally, a base may be stationary, and a slide rail is not necessary for the link mechanism to function.

Figure 2:
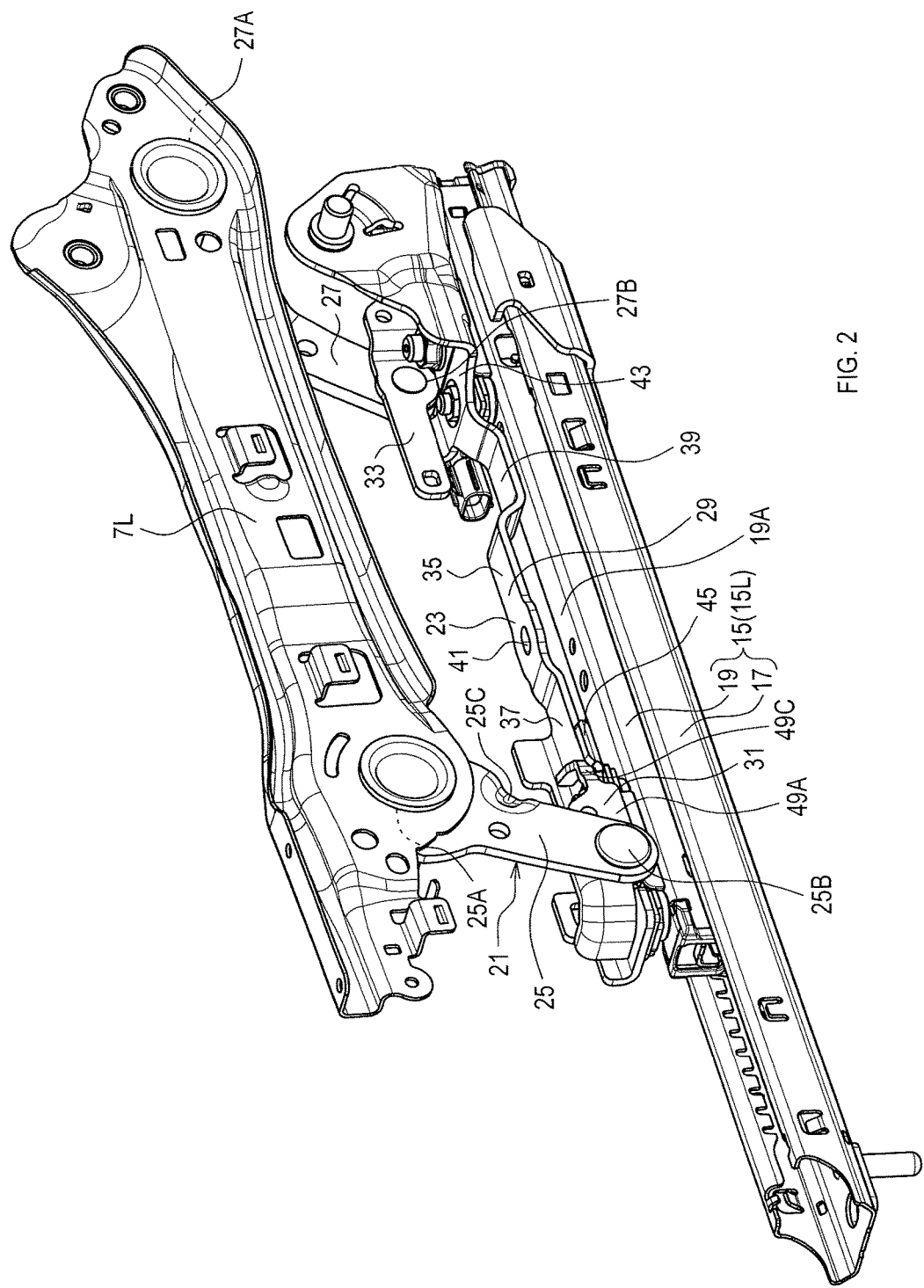
FIG. 2 is a perspective view illustrating a configuration of a link mechanism linking a left side slide rail to a left side frame.
Figure 3:
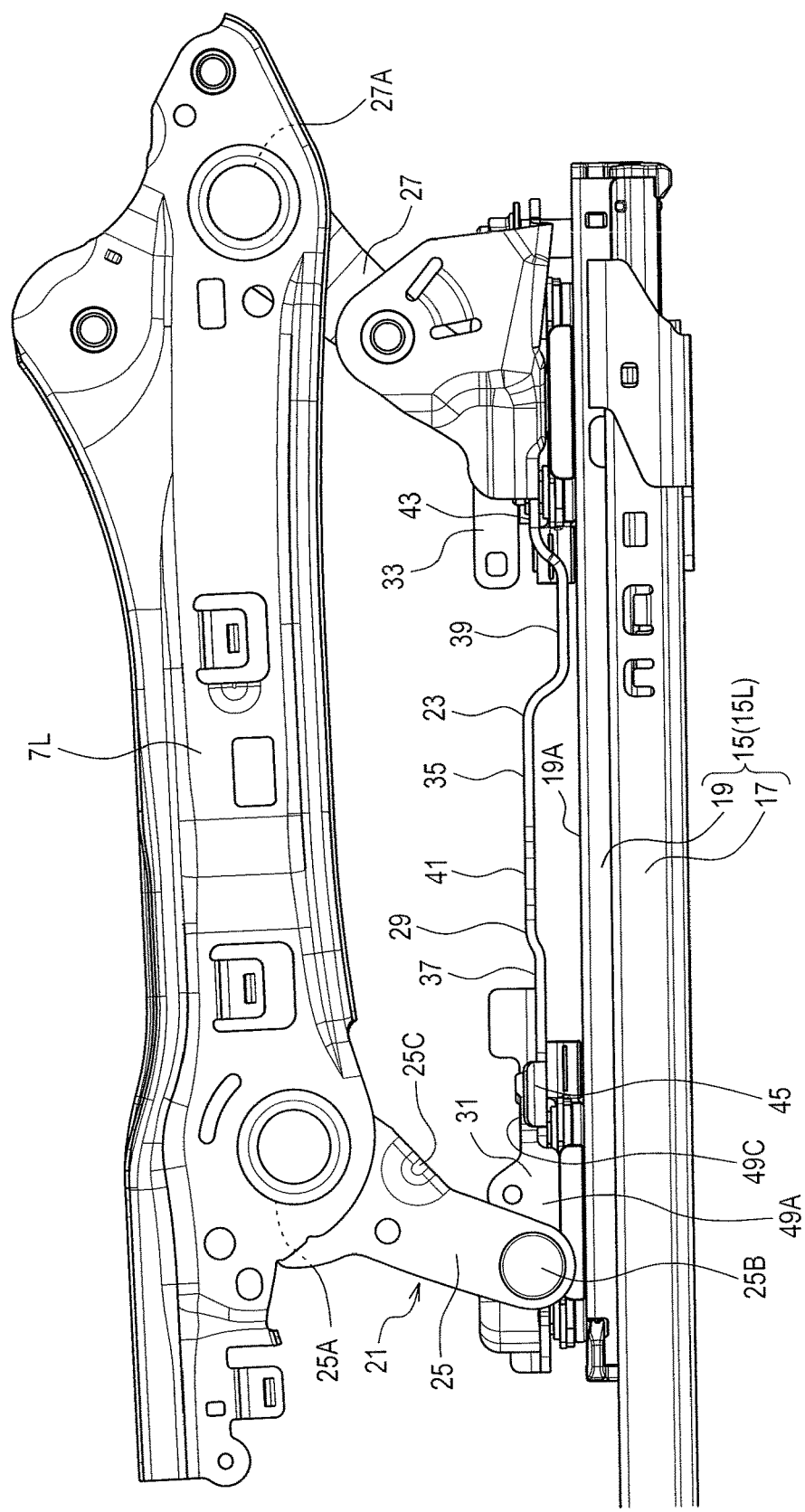
FIG. 3 is a side view illustrating the configuration of the link mechanism.

As shown in FIG. 1 to FIG. 3, the side frame 7L and the slide rail 15L are coupled together (rotatably linked) by the link mechanism 21.

Figure 4:
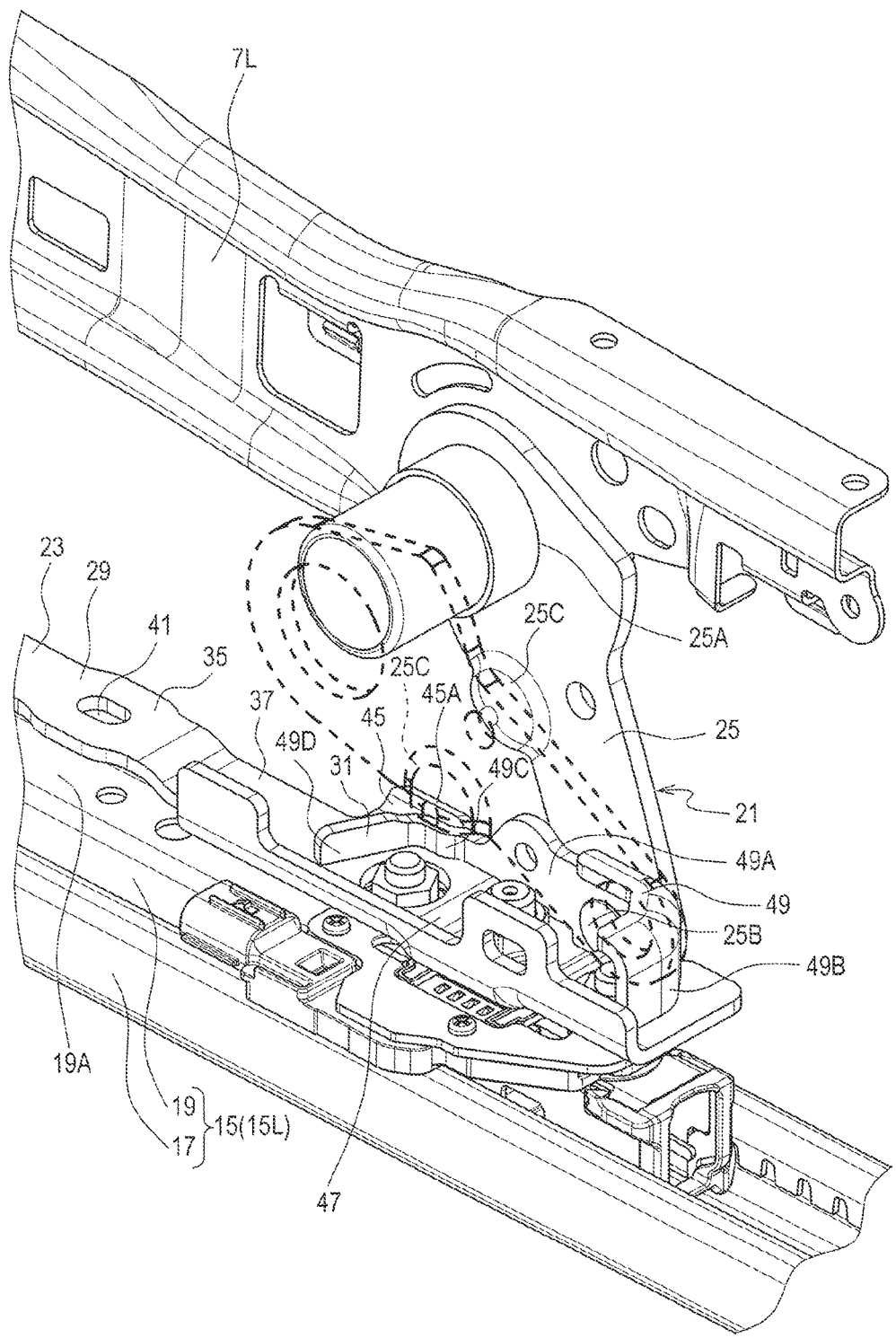
FIG. 4 is a perspective view illustrating a configuration of a frontward part of the link mechanism, viewed outwardly from beneath the vehicle seat.

The link mechanism 21 comprises a bracket 23, a first link 25, and a second link 27. As shown in FIG. 1 to FIG. 6, the bracket 23 is mounted on an upper side of the upper rail 19. As shown in FIG. 2 and FIG. 4, the bracket 23 comprises a first part 29 and a second part 31. The first part 29 and the second part 31 may be separate parts. The first part 29 and the second part 31 may be joined together by welding. The first part 29 is an elongated part extending in the front-rear direction. The first part 29 is formed by bending a metal plate. The first part 29 is provided, in a rear-end vicinity thereof, with the rear pivotally-supporting part 33 extending upward.

As shown in FIG. 2 and FIG. 3, the first part 29 comprises a spaced portion 35, a front portion 37, and a rear portion 39. The spaced portion 35 is located above an upper surface 19A (of the upper rail 19) and is spaced apart from the upper surface 19A. The front portion 37 is located frontward of the spaced portion 35. The front portion 37 has a shorter distance to the upper surface 19A than does the spaced portion 35. The distance to the upper surface 19A is a distance between a lower surface of the first part 29 and the upper surface 19A in a vertical direction. The rear portion 39 is located rearward of the spaced portion 35. The rear portion 39 has a shorter distance to the upper surface 19A than does the spaced portion 35. The spaced portion 35, the front portion 37, and the rear portion 39 are located rearward of a below-described intermediate portion 49A and frontward of the rear pivotally-supporting part 33.

As shown in FIG. 2 to FIG. 5, the first part 29 includes a clamp mounting hole 41. The clamp mounting hole 41 is a hole penetrating through the spaced portion 35 in the vertical direction. The clamp mounting hole 41 is a hole elongated in the front-rear direction. The clamp mounting hole 41 is located above the upper surface 19A. A clamp (not shown) installed in the clamp mounting hole 41 secures a wire harness.

As shown in FIG. 2 and FIG. 3, the first part 29 comprises: spaced portion 35, front portion 37, rear portion 39, clamp mounting hole 41, rear-sided spaced portion 43, and first contact portion 45 (including bent portion 45A). The rear-side spaced portion 43 is located rearward of the rear portion 39. The rear-side spaced portion 43 has a longer distance to the upper surface 19A than does the rear portion 39. The first part 29 is secured, at the rear-side spaced portion 43, to the upper rail 19 by using a rear bolt. The first part 29 is also secured to the upper rail 19 frontward of the front portion 37 by using a front bolt.

As shown in FIG. 3 to FIG. 6, the first part 29 includes the first contact portion 45. The first contact portion 45 comprises, at an outer end thereof, the bent portion 45A that is bent upward. This bent portion 45A is most clearly shown in FIG. 6. An upper surface of the bent portion 45A contacts (not shown) a protruding portion 25C when tilting occurs, and thus restricts the rotation of the first link 25. The upper surface may be coplanar with the front and right directions, and may form a thin rectangle with a long axis pointing in the front direction. Similarly, an upper surface of second contact portion 49C contacts (shown in FIG. 6) the protruding portion 25C when tilting does not occur, and thus restricts rotation of the first link 25. The upper surface of second contact portion 45C may also form a thin rectangle with a long axis pointing in the front direction, and may be parallel with and coplanar with the upper surface of the bent portion 45A.

The second part 31 is optionally welded to a front part of the first part 29. The second part 31 is formed by bending a metal plate. As shown in FIG. 4, the second part 31 comprises a flat portion 47 and a raised portion 49. The flat portion 47 is secured to the first part 29 with an additional bolt. The raised portion 49 is joined to an outer side of the flat portion 47 and is bent to extend upward. The raised portion 49 comprises an intermediate portion 49A, a front end portion 49B, a second contact portion 49C, and a rear portion 49D. The intermediate portion 49A is a portion extending in the front-rear direction in a plan view (not shown). The front end portion 49B is located frontward of the intermediate portion 49A and is bent inward (to the right) in the plan view. The second contact portion 49C is located rearward of the intermediate portion 49A and extends inward in the plan view. The rear portion 49D is located rearward of the second contact portion 49C and extends further inward than the second contact portion 49C in the plan view.

A position of the second contact portion 49C in the front-rear direction aligns a position of a front part of the first contact portion 45 in the front-rear direction.

As shown in FIG. 1 to FIG. 5, the first link 25 is rotatably coupled, at an upper end portion 25A, to the front pipe 11 and is rotatably coupled, at a lower end portion 25B, to the intermediate portion 49A. As shown in FIG. 1 to FIG. 6, the first link 25 comprises, at a portion thereof that comes in contact with the second contact portion 49C or the first contact portion 45 when the first link 25 is rotated, a portion protruding inward (hereinafter, referred to as a protruding portion 25C). Protruding portion 25C comes into contact with second contact portion 49C as shown in FIG. 6 when first link 25 is in a down position (indicated by the dashed lines in FIG. 6). Protruding portion 25C comes into contact with the bent portion 45A of the first contact portion 45 when first link 25 is pushed or twisted or rotated in the "X" direction (left direction) as shown in FIG. 6.

As shown in FIG. 1 and FIG. 2, the second link 27 is located rearward of the first link 25. The second link 27 is rotatably coupled, at an upper end portion 27A, to the rear pipe 13 and is rotatably coupled, at a lower end portion 27B, to the rear pivotally-supporting part 33.

A height of the seat cushion 5 is changeable by rotation of the first link 25 and the second link 27 that make up the link mechanism 21. The vehicle seat 1 comprises a brake mechanism (not shown) that restricts or permits operation of the link mechanism 21 according to a user operation.

As shown in FIG. 1, the side frame 7R and the slide rail 15R are coupled together (rotatably linked) by a known link mechanism 51.

2. Advantages Provided by Vehicle Seat 1

The vehicle seat 1 provides the following advantages.

Figure 5:
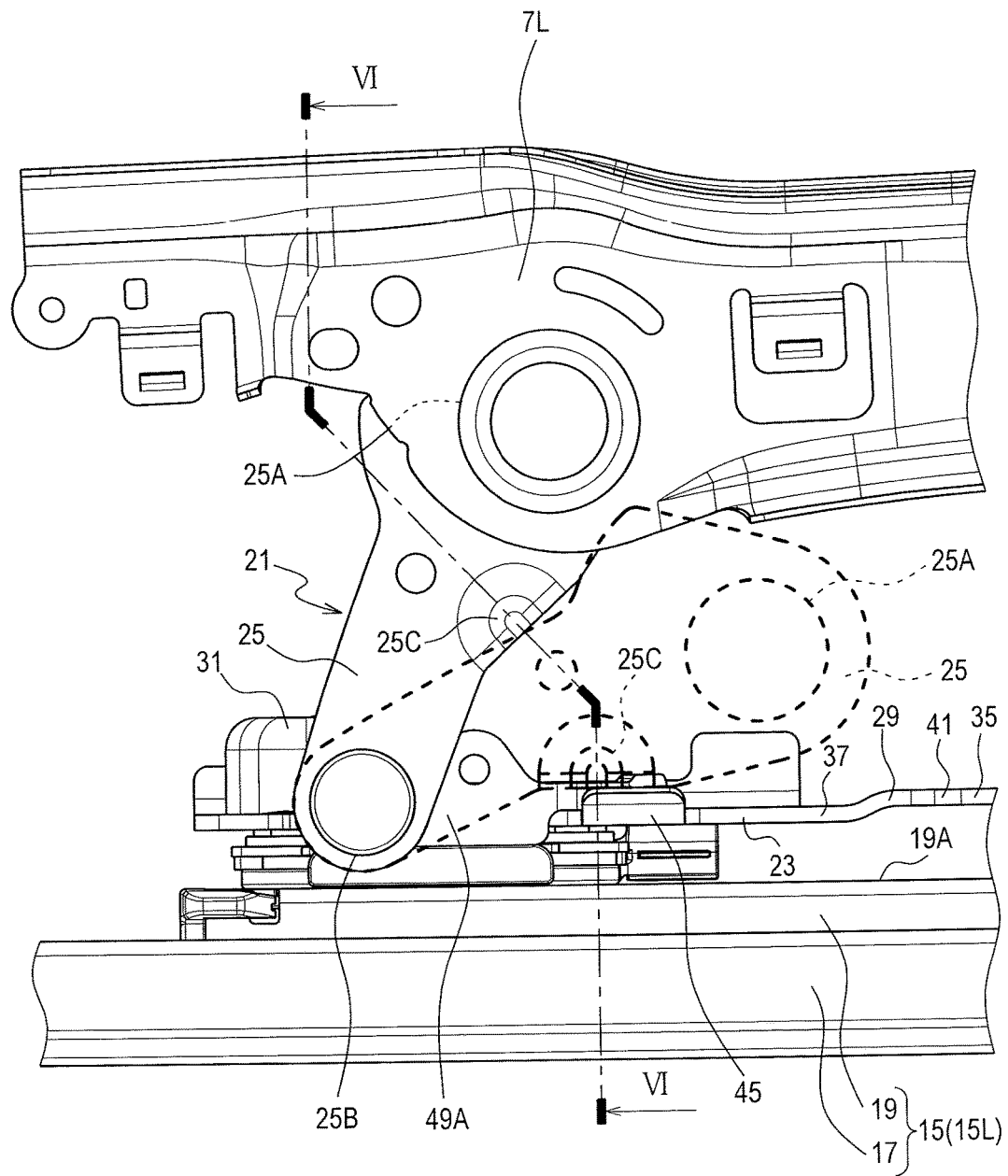
FIG. 5 is a side view illustrating the first link rotated into an up position and rotated into a down position.
Figure 6:
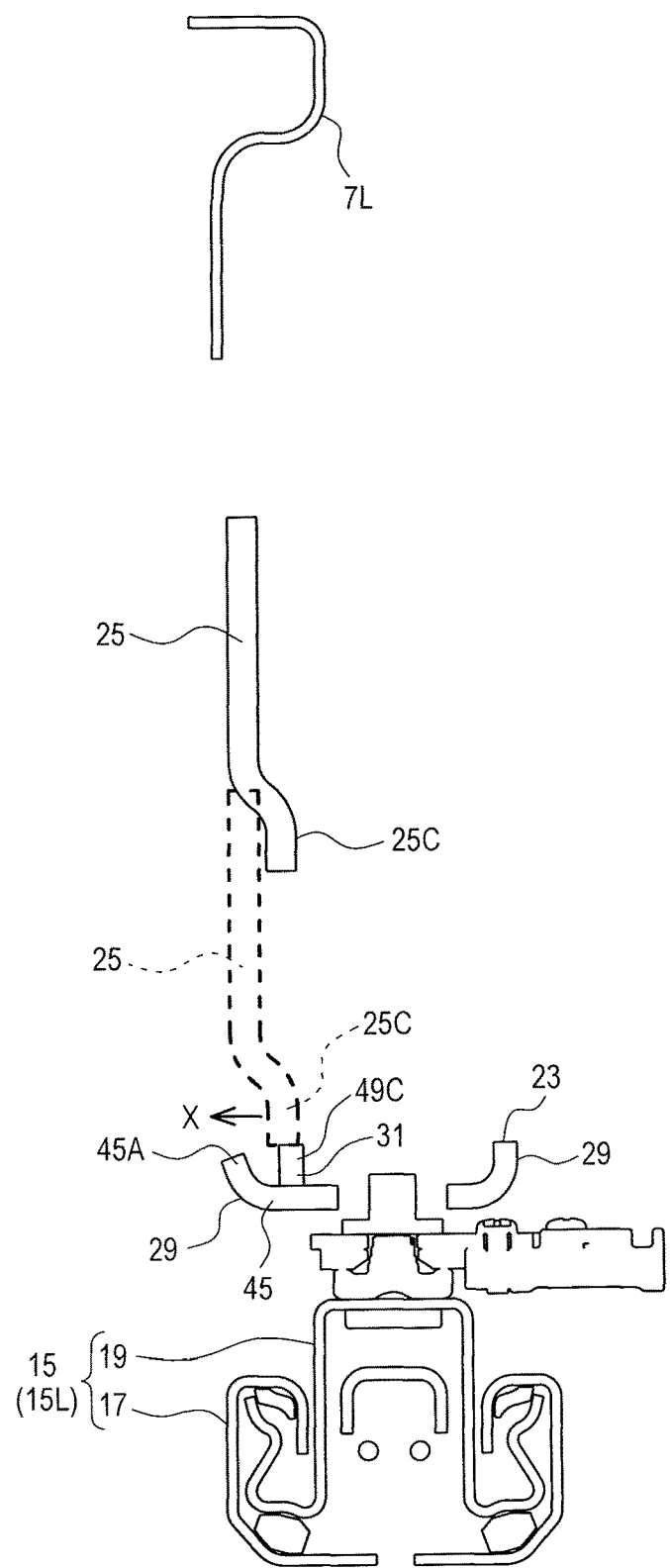
FIG. 6 is a sectional view of section VI-VI in FIG. 5 showing the first link rotated into an up position and rotated into a down position.

(1A) In a crash of the automobile equipped with the vehicle seat 1, the first link 25 is rotated to a position indicated by dotted lines in FIG. 4 and FIG. 5. If the first link 25 is not tilted in a width direction at that time, then the protruding portion 25C comes in contact with the second contact portion 49C from above, as shown in FIG. 6. This contact restricts a rotatable range of the first link 25, and determines a minimum downward movement of the seat cushion 5.

If the first link 25 is tilted in the X direction indicated by an arrow in FIG. 6 (to the right) in a crash of the automobile equipped with the vehicle seat 1, then the protruding portion 25C comes in contact with the bent portion 45A (of the first contact portion 45) from above. This also allows the rotatable range of the first link 25 to be restricted when the first link 25 is tilted in the width direction. Thus, the rotatable range is restricted during the crash (during tilting) without increasing the plate thickness of first link 25.

(1B) The bracket 23 comprises the first part 29 comprising the first contact portion 45. The bracket 23 also comprises the second part 31 comprising the second contact portion 49C. The second part 31 may be separate from the first part 29 (or may optionally be welded together). This allows a relative position of the second contact portion 49C with respect to the first contact portion 45 to be adjusted by changing a relative position of the second part 31 with respect to the first part 29. Consequently, this facilitates adjustment of the relative position of the second contact portion 49C with respect to the first contact portion 45.

(1C) The position (orientation) of the second contact portion 49C in the front-rear direction aligns the position (orientation) of the front part of the first contact portion 45 in the front-rear direction. This more fully ensures contact between the protruding portion 25C and the first contact portion 45 when the first link 25 is tilted to the left (as shown in FIG. 6). In some embodiments, the protruding portion 25C may contact the first contact portion 45 and the second contact portion 49C simultaneously.

(1D) The first contact portion 45 comprises, at the outer end thereof in the width direction, the bent portion 45A that is bent upward. Since the protruding portion 25C coming down is contacted (when protruding portion 25C is tilted to the left) by the bent portion 45A, then the protruding portion 25C is inhibited from slipping outward, off the first contact portion 45.

Other Embodiments

The present disclosure is not limited to the above-described embodiments. Other embodiments can be implemented with various modifications described below.

(1) The first contact portion 45 may have an approximately L shape in a front view. To be specific, the first contact portion 45 may have a shape comprising a horizontal plate portion and a portion extending upward from an end of the horizontal plate portion. For example, the bent portion 45A may be created by a welded vertical plate.

(2) The bracket 23 is not limited to a part comprising a plurality of separate members, but may be an integral part including the first part 29 and the second part 31 (created as an integral part, or welded together into an integral part).

(3) The vehicle seat 1 may be a seat for a vehicle other than an automobile. Vehicles other than automobiles may include, for example, railway vehicles, aircrafts, ships and boats.

(4) Functions of one element of the above-described embodiments may be distributed to a plurality of elements. Functions of a plurality of elements may be performed by one element. Part of the configurations of the above-described embodiments may be omitted. At least part of the configurations of the above-described embodiments may be added to or replaced with the configurations of the other above-described embodiments. Any embodiment included in the technical ideas defined by the language of the claims is an embodiment of the present disclosure.

What is claimed is:

1. A vehicle seat comprising:
a seat main body;
a base located below the seat main body;
a bracket mounted on an upper side of the base;
a link that is rotatably coupled, at one end thereof, to the seat main body and is rotatably coupled, at an end thereof opposing the one end, to the bracket; and
a contact portion that is provided to the bracket to restrict a rotatable range of the link by coming in contact with the link,
wherein the contact portion comprises a first contact portion and a second contact portion, the first contact portion being arranged in a position that partially differs from a position of the second contact portion in a width direction of the seat main body, the second contact portion restricts the rotatable range of the link upon the second contact portion being brought into contact with the link and the first contact portion restricts a tiltable range out of a plane of the link upon the first contact portion being brought into contact with the link.

2. The vehicle seat according to claim 1,
wherein the bracket comprises:
a first part comprising the first contact portion; and
a second part comprising the second contact portion and being separate from the first part.

3. The vehicle seat according to claim 1,
wherein a position of at least part of the first contact portion and a position of at least part of the second contact portion each align in a front-rear direction of the vehicle seat.

4. The vehicle seat according to claim 1,
wherein the first contact portion comprises, at an end thereof in the width direction of the seat main body, a bent portion that is bent upward.

5. The vehicle seat according to claim 4,
wherein the bent portion has an approximately L shape in a front view.

6. The vehicle seat according to claim 1, the link being configured to be movable between a position out of contact with both of the first contact portion and the second contact portion and positions in which the link is in contact with the first contact portion or with the second contact portion.

7. A vehicle seat comprising:
a seat main body;
a base located below the seat main body;
a bracket mounted on an upper side of the base;
a link that is rotatably coupled, at one end thereof, to the seat main body and is rotatably coupled, at an end thereof opposing the one end, to the bracket; and
a contact portion that is provided to the bracket to restrict a rotatable range of the link by coming in contact with the link,
wherein the contact portion comprises a first contact portion and a second contact portion, the first contact portion being arranged in a position that partially differs from a position of the second contact portion in a width direction of the seat main body, wherein the link is rotatable within a plane so as to contact one of the first contact portion and the second contact portion and is tiltable out of the plane to contact the other of the first contact portion and the second contact portion.

8. The vehicle seat according to claim 1, wherein the first contact portion and the second contact portion project substantially parallel to each other.

9. The vehicle seat according to claim 1, wherein an end surface of a protruding portion of the link is configured to contact an end surface of either the first contact portion or the second contact portion.

10. The vehicle seat according to claim 7,
wherein the bracket comprises:
a first part comprising the first contact portion; and
a second part comprising the second contact portion and being separate from the first part.

11. The vehicle seat according to claim 7,
wherein a position of at least part of the first contact portion and a position of at least part of the second contact portion each align in a front-rear direction of the vehicle seat.

12. The vehicle seat according to claim 7,
wherein the first contact portion comprises, at an end thereof in the width direction of the seat main body, a bent portion that is bent upward.

13. The vehicle seat according to claim 12,
wherein the bent portion has an approximately L shape in a front view.

14. The vehicle seat according to claim 1,
wherein the first contact portion and the second contact portion come into contact with a predetermined surface of the link.

* * * * *